No. 886,398. PATENTED MAY 5, 1908.
G. NARDIN.
MACHINE FOR CUTTING TOOTHED GEARING.
APPLICATION FILED MAR. 28, 1907.
3 SHEETS—SHEET 2.
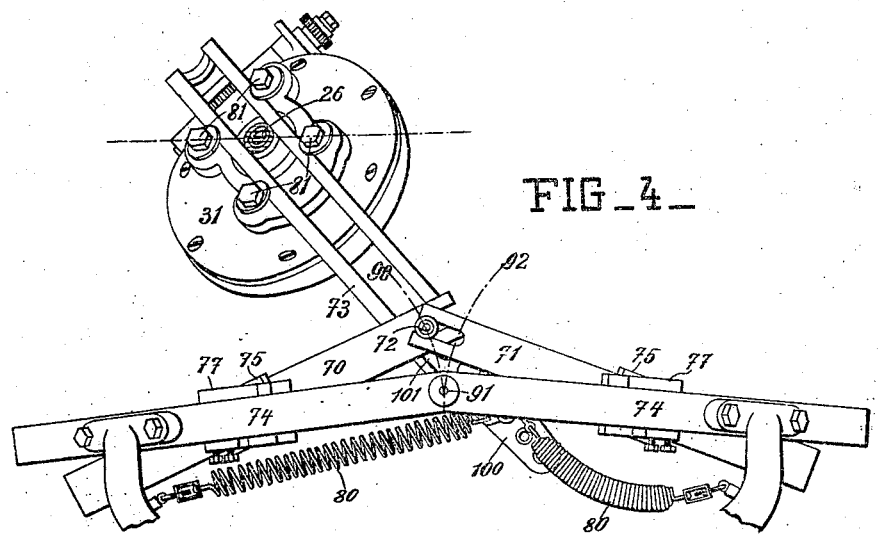
FIG_4_
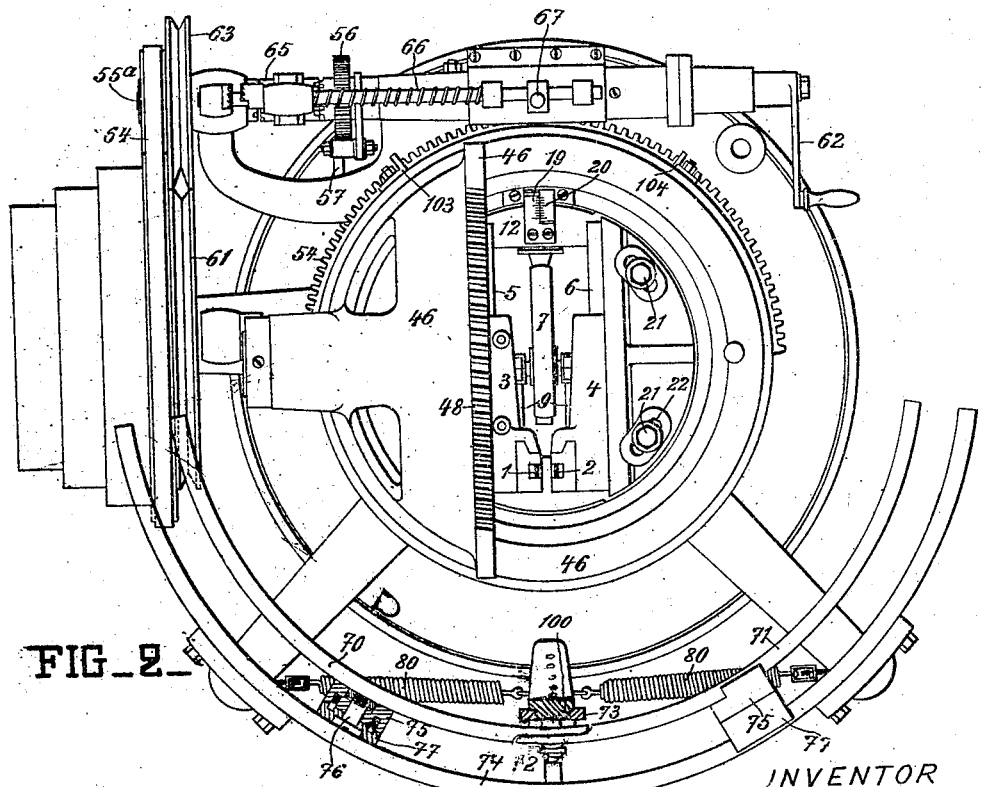
FIG_2_
WITNESSES
INVENTOR
Georges Nardin,
By his Attorneys

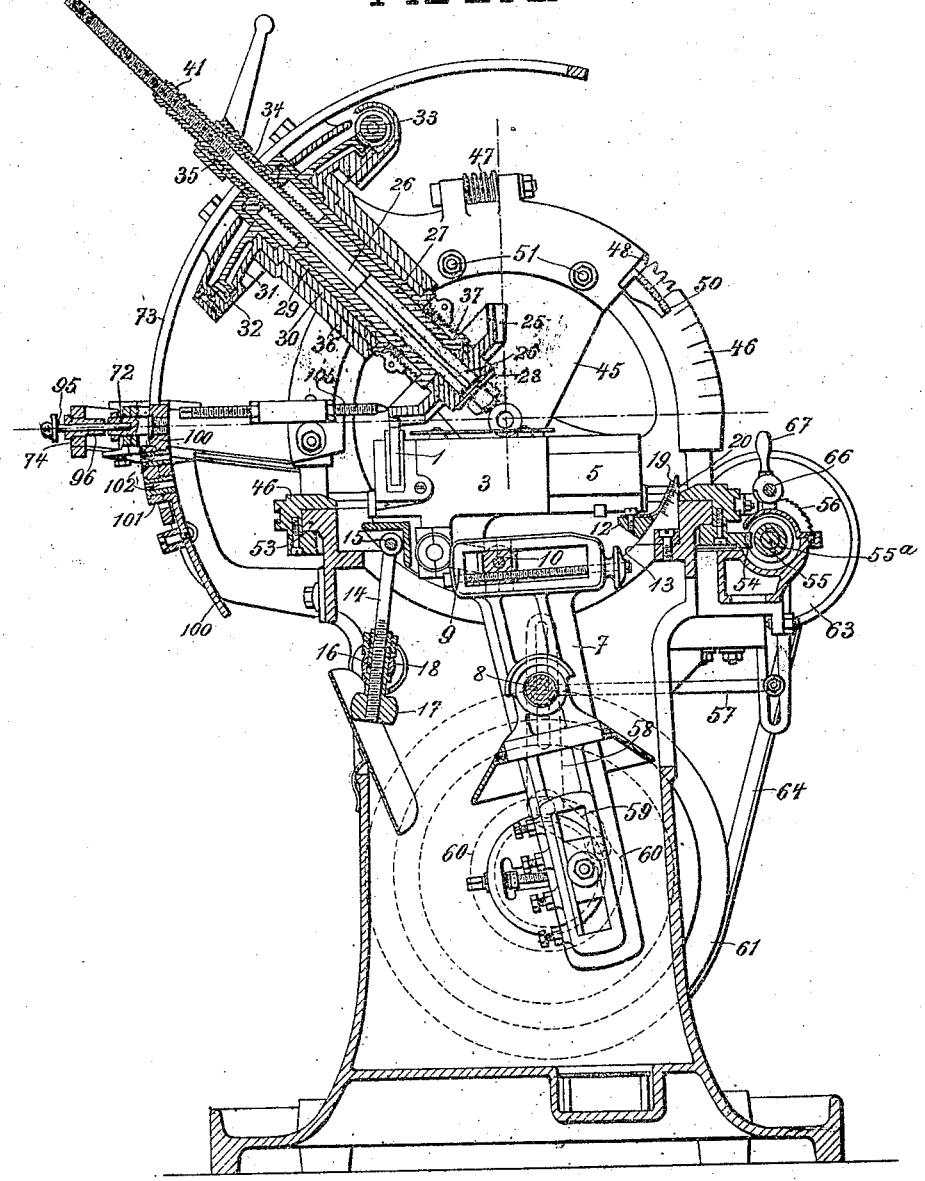

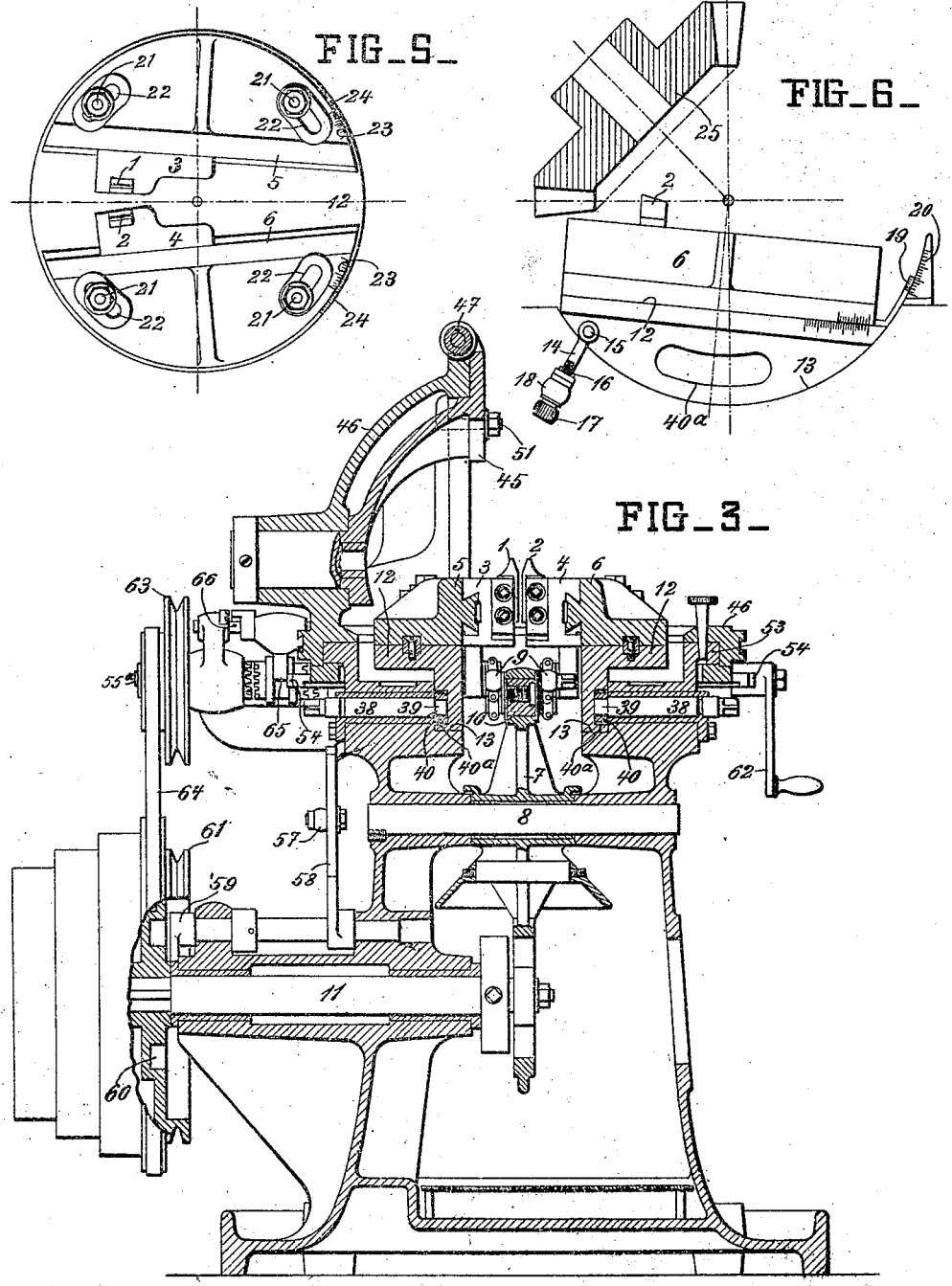

UNITED STATES PATENT OFFICE.

GEORGES NARDIN, OF PARIS, FRANCE, ASSIGNOR OF ONE-HALF TO THE FIRM OF ATELIERS DE CONSTRUCTIONS MÉCANIQUES CI-DEVANT DUCOMMUN, OF MÜLHAUSEN, ALSACE, GERMANY.

MACHINE FOR CUTTING TOOTHED GEARING.

No. 886,398.

Specification of Letters Patent.

Patented May 5, 1908.

Application filed March 28, 1907. Serial No. 364,984.

*To all whom it may concern:*

Be it known that I, GEORGES NARDIN, a citizen of the French Republic, and resident of Paris, France, engineer, have invented new and useful Improvements in Machines for Cutting Toothed Gearing, of which the following is a full, clear, and exact description.

This invention relates to improvements in the machine for cutting toothed gearing, especially bevel gearing, forming the subject of a former patent No. 831234 and is based on the principle of cutting by the relative rolling of the wheel blank, to be cut with regard to two adjustable shaping tools, forming between them a space with straight flanks and which upon a relative movement between them and the wheel blank transversely to the axis of the latter are designed to shape simultaneously the two gearing flanks of a tooth at once, and that with the requisite convergence for bevel wheels.

In the former arrangement such as is described and shown in the said patent the elevation of each tool carriage to the base of the tooth or of the space takes place separately and this might give rise to faults or differences. In the said improved machine, not only has it been sought to avoid these faults but the regulation of the adjustment of the elevation of the tool carriages is simplified and made exact. Further, the improvements allow of dispensing with the shafts which in the former construction carried the guides for the tool carriages and by means of which the separate elevation of the latter is effected, the said shafts being cumbersome and sometimes interfering with the rolling of the wheel blank.

The principal feature of the new arrangement is that the guides for the tool carriages instead of being carried by the pivoting shafts are carried by a common base of cradle form resting in a recess curved, for this purpose, in the frame of the machine and provided with an adjusting arrangement for imparting a precise angular displacement to the said cradle base so as to raise the guides of the tool carriages at once or together in the same plane with the object of allowing an exact and simultaneous elevation of both tools to take place, while dispensing with the pivoting shafts supporting the carriage guides in the former arrangement.

This important improvement, as well as other innovations, which appear in the machine described in the said former patent will be better understood by the following description reference being made to the accompanying drawings, in which:

Figure 1 is a vertical cross section of the improved machine. Fig. 2 is a plan, part in horizontal section, some parts such as the puppet for the wheel blank and the puppet bearing sector being omitted for sake of clearness. Fig. 3 is a vertical section at right angles to that shown in Fig. 1. Figs. 4 and 5 relate to details, Fig. 4 showing the arrangement of guiding levers for correctly controlling the rolling of the wheel blank and Fig. 5 showing in plan the cradle base supporting the guides for the tool carriages. Fig. 6 illustrates diagrammatically the mounting of the said cradle and shows how, by means of the latter, both tools can at once be accurately adjusted to the required elevation.

1 and 2 indicate the two parallel shaping tools, carried in a vertical position by the sliding carriages 3, 4, and together forming a tooth-space with straight flanks, (Fig. 3).

The carriages 3, 4 are guided by the carriage guides 5, 6 and actuated in a similar manner to that described in the said patent by means of an oscillating lever 7, pivoted on the shaft 8, and the upper arm of which is connected by means of jointed rods 9 and a sliding block 10 adjustable by a regulating screw, to the tool carriages 3, 4 and the lower arm of which receives motion from the crank driving shaft 11.

The carriage guides 5, 6 rest with their segmental base (see Fig. 5) upon the cradle base 12 which has a wide slot in its middle part to give free play to the upper arm of the oscillating lever 7 and to the parts which connect it to the tool carriages. The cradle base 12 rests in a curved recess 13 of corresponding form in the frame of the machine and the curvature of which is clearly shown in Figs. 1 and 6. In this recess, the cradle base 12 can be angularly displaced with the object of simultaneously raising the tools 1, 2, according to the depth of the tooth to be cut; the said displacement can be effected by means of a screw threaded rod 14 connected at 15 to the cradle base and of a screwed sleeve 16 provided with an operating knob 17 and held so that it can turn, without being displaced longitudinally in a hinged block 18.

The cradle base 12 is provided, on the upper side with a graduated plate 19 movable in regard to a fixed scale 20 and allowing of the exact angular adjustment of the cradle base. This latter can be secured in all positions of adjustment by means of the two shafts 38, (Fig. 3) each provided with an eccentric end 39 having a block 40 engaging a curved slot 40ª in the cradle base and which by angular displacement can be caused to exert on the cradle base a locking pressure sufficient to render it immovable in its curved seat.

The carriage guides 5 and 6 are each fixed to the cradle base 12 by means of two locking bolts 21 (Figs. 2 and 5) passing through the curved slots 22 in the segmental base of the respective carriage guides, which allows of giving to the guide carriages 5 and 6 the necessary convergence for cutting bevel wheels, or a parallel direction for the cutting of spur wheels. Graduated scales 23, 24, (Fig. 5) serve to facilitate the determination of the angle of convergence required.

The wheel blank 25 is carried by a puppet having a dividing arrangement which is also an improvement on the aforementioned patent and comprises a stem forming a mandrel 26 which is adjustable in a barrel 27 and provided with a washer 28, between which and the end of the barrel the body of the wheel blank is held owing to an upper screw thread with a locking nut 41, with which the stem or mandrel is provided. The barrel 27 carrying the mandrel is held in a rotary cylinder 29 supported in a sleeve portion 30 of a casing 31 inclosing the dividing arrangement which comprises a dividing toothed wheel 32 fixed on the cylinder 29 and a worm 33 gearing with this said dividing wheel, by the rotation of which the cylinder 29 with the barrel 27 carrying the mandrel and the wheel body may be made to turn through a determined angular distance, when it is required to cause the body of the wheel to turn on itself for the purpose of cutting a new tooth.

The barrel 27 carrying the mandrel is longitudinally adjustable in the cylinder 29 for placing the wheel body in position, by means of a screw threaded portion 34 with which it is provided and which carries a sleeve-like nut 35 capable of turning, but which cannot be moved longitudinally, this sleeve-like nut being provided with an operating handle. A longitudinally extensible ring 37 is interposed between a flange on the barrel 27 and a flange on the cylinder 29. The whole of this puppet having a dividing arrangement is carried by the sleeve portion 30, in a bearing 36 of a puppet bearing sector 45 which can be angularly displaced in the vertical plane for adjusting the inclination of the mandrel carrying the wheel, being pivoted (Fig. 3) to a bracket 46, in front of which the said sector can be adjusted by means of a worm 47 on the latter gearing with a curved rack 48 on the bracket.

The accurate adjustment of the puppet-carrying sector 45 being effected (a vernier scale 50 facilitates this adjustment) the puppet carrying sector can be fixed in position by the locking bolts 51 (Fig. 3) engaging with a hook behind a shoulder on the bracket 46. The bracket 46 is mounted upon a horizontal circular rail on the frame of the machine so that it can turn in a horizontal plane, with all the parts that it carries. This rotary movement of the bracket 46 is intermittent and has for object to displace, step by step the bracket with the wheel blank, in front of the shaping tools, transversely to the axis of the wheel and to the movement of the said tools, so that the wheel is thus brought by the intermittent movement from one side to the other with relation to the tools, in passing in front of them; the tools, in this travel of the wheel, effect the cutting of its teeth. The said movement is effected by means of a rack 54 and a worm 55, actuated in a well known manner, by a ratchet arrangement 56 controlled by a system of levers 57, 58, 59, actuated through the medium of a heart-shaped cam 60 and a stepped pulley 61 mounted upon the driving shaft 11.

The feeding worm shaft 55ª is provided with a crank handle 62 (Figs. 2 and 3) for operating it by hand if required. Moreover, it is provided with a grooved pulley 63 connected by a strap or belt 64 to the pulley 61, this transmission being adapted to produce the automatic rapid return of the bracket 46 when a tooth has been cut. This transmission is combined with a toothed clutch of which the movable sleeve 65, mounted by means of a key and keyway on the worm shaft 55ª enters into engagement with the loose ratchet wheel of the ratchet gear 56 when cutting of a tooth takes place, while for the rapid return of the bracket 46 after the said cutting, the clutch sleeve 65 is coupled with the grooved pulley 63 for transmitting the rotary movement from the latter to the worm shaft 55ª, the ratchet gear being disengaged as regards the control of said worm shaft.

The displacement of the clutch sleeve 65 can be effected by means of the operating rod 66 by having a handle 67 for working it by hand; it is worked mechanically by means of the tappets 103, 104, (Fig. 2) which are movable in a circular groove made in the periphery of the base of the bracket 46 (Fig. 3).

The rolling of the wheel blank for cutting each tooth is effected during the rotation of the bracket 46, by means of two arc shaped guiding levers 70, 71, on the same principle as in the said former patent, which embrace with their forked end (Fig. 4) a pin 72 carried by an arc shaped arm 73 fixed to the casing 31 of the dividing arrangement by means of four bolts 81 and provided with a longitudinal slot in which pass the upper parts of the barrel 27 and the mandrel 26 of the puppet carrying the wheel. The guiding levers 70, 71, are pivoted to a curved fixed bar 74 in such a manner that their pivotal point can be adjusted along the said bar. To this end, each lever is held by a double clamp 75 (Figs. 2 and 4) hinged by a pivot 76 to a slide block 77, adjustably carried by the fixed bar 74 and which can be moved thereon when required carrying with it the said double clamps 75, so as to change the position of the pivotal point of the lever. The arc shaped arm 73 is controlled by one or the other of two spiral springs 80 (each of which acts for an active rolling movement in one direction). The effect of this arrangement of guiding levers is as follows: When the bracket 46 with the puppet-carrying sector is caused to turn step by step in a horizontal plane, the arc shaped arm 73 is carried along and as it is supported by means of the pin 72 at the bottom of the fork of one of the levers 70, 71 (the lever 70 Fig. 4), it is compelled to turn at the same time and thereby produce an intermittent rotation of the wheel blank around its own axis, at the same time that it is intermittently advanced in front of the shaping tools, transversely to the movement of the latter so that a combined movement is produced or an intermittent rolling of the wheel blank in front of the shaping tools, or in other words, a gear-like engagement of the wheel blank with the cutting tools, the control of the bracket 46 being effected in such a manner that the latter shall only be advanced when the tools come out of touch with the wheel blank. In the first half of this rolling movement, starting from the position shown in Fig. 4, the pin 72, supported by the lever 70, through one of the springs 80, will follow the arc shaped path 90 to be abandoned at the middle of the course at 91, to the fork of the lever 71 and then find its support in the latter, always under the action of the spring 80 which is in play so as to describe the symmetrical arc-shaped path 92, these two paths corresponding in shape to the cycloidal arcs produced by the point of contact of the circle of origin of the wheel blank which will be understood when it is considered that when a circle rolls upon a flat path the point of contact describes cycloidal curves and inversely the moment the point of contact of the circle of origin of the wheel blank describes two cycloidal arcs the rolling of the latter is perfect. It is understood that the two levers 70, 71 oscillate, in the rolling movement of the wheel blank between the position represented in Fig. 4 and the position in which the pin 72 coincides with the middle 91 of the fixed bar 74. The curvature of the path that the pin 72 describes may be varied to a certain extent by changing the position of the pivotal point of the guide levers 70, 71 on the fixed bar 74. For this adjustment and for other controlling purposes the levers 70, 71 are preferably brought into a position in which the pin coincides with the middle 91 of the bar 74 and in which it can be fixed by a locking pin 95 passed through a socket 96 provided at this point in the said bar.

The pin 72 is adjustable in the slot of the arc shaped arm 73. To this end, it is carried by a slide 100 (Fig. 1) guided in the slot of the said arm and adapted to be fixed thereto by means of a clamping plate 101, projecting above the edges of the slot and capable of being secured in position by means of two hollow screws 102. The slide 100 is shown in cross section in Fig. 2. To a tail on this slide are adjustably attached the spiral springs 80 only one of which acts at a time to assist in causing the wheel blank to roll.

105, (Fig. 1) is an adjustable stop for the wheel blank.

What I claim is:

1. In a machine for cutting toothed wheels, especially bevel wheels, on the rolling principle, the combination with two shaping tools together forming a tooth space with straight flanks, movable carriages for these tools, guides for these tool carriages, a wheel-bearing puppet and a device for producing a relative rolling movement between this wheel-bearing puppet and the shaping tools transversely to the sliding movement of the latter, of a common base for the guides of the tool carriages, a seat in the frame of the machine to receive this base and an adjusting device for giving an angular displacement to said base so as to cause the elevation of the tool-carriage guides at once or together in the same plane, with the object of allowing an exact and simultaneous elevation of both tools, substantially as hereinbefore described.

2. In a machine for cutting toothed wheels, especially bevel wheels, on the rolling principle, the combination with two shaping tools together forming a tooth space with straight flanks, movable carriages for these tools, guides for these tool carriages, a wheel-bearing puppet and a device for producing a relative rolling movement between this wheel-bearing puppet and the shaping tools transversely to the sliding movement of the latter, of a common base for the guides of the tool carriages, a seat in the frame of the machine to receive this base, an adjusting device for giving an angular displacement to said base so as to cause the elevation of the tool-carriage guides at once or together in the same plane, and a locking device allowing of fixing the said base in any position to which it may be adjusted, substantially as hereinbefore described.

3. In a machine for cutting toothed wheels, especially bevel wheels, on the rolling principle, the combination with two shaping tools together forming a tooth space with straight flanks, movable carriages for these tools, guides for these tool carriages, a wheel-bearing puppet and a device for producing a relative rolling movement between this wheel-bearing puppet and the shaping tools transversely to the sliding movement of the latter, of a common base for the guides of the tool carriages, a seat in the frame of the machine to receive this base, an adjusting device for giving an angular displacement to said base so as to cause the elevation of the tool carriage guides at once or together in the same plane, and two locking shafts having eccentric ends engaging the said base and adapted to allow of fixing the latter in any position to which it may be adjusted, substantially as hereinbefore described.

4. In a machine for cutting toothed wheels, especially bevel wheels, on the rolling principle, the combination with two shaping tools together forming a tooth space with straight flanks, movable carriages for these tools, guides for these tool carriages, a wheel-bearing puppet and a device for producing a relative rolling movement between this wheel-bearing puppet and the shaping tools transversely to the sliding movement of the latter, of a common base for the guides of the tool carriages, having the form of a cradle, a curved recess in the frame of the machine to receive this base and an adjusting device for giving an angular displacement to said base so as to cause the elevation of the tool-carriage guides at once or together in the same plane, with the object of allowing an exact and simultaneous elevation of both tools, substantially as hereinbefore described.

5. In a machine for cutting toothed wheels, especially bevel wheels, on the rolling principle, the combination of two shaping tools, movable carriages for these tools, guides for these tool carriages, a wheel-bearing puppet, a controlling gear for this wheel-bearing puppet arranged so as to cause it to move transversely to the sliding movement of the shaping tools, an auxiliary driving mechanism adapted to produce the automatic and rapid return of the said wheel-bearing puppet and a coupling device interposed between this auxiliary driving mechanism and the puppet controlling gear and arranged so as to be capable of disengaging this gear and of engaging the said auxiliary driving mechanism with the object of allowing the automatic and rapid return of the wheel-bearing puppet, substantially as hereinbefore described.

6. In a machine for cutting toothed wheels especially bevel wheels, on the rolling principle, the combination of two shaping tools, movable carriages for these tools, guides for these tool carriages, a wheel-bearing puppet, a controlling gear for this wheel-bearing puppet arranged so as to cause it to move transversely to the sliding movement of the shaping tools, two guide levers for guiding the wheel-bearing puppet during its transverse movement, two springs adapted to hold the wheel-bearing puppet in constant guide-relation with the said guide levers and to compel it, with the aid of these latter, to rotate together with the wheel blank upon its own axes when it is moved transversely, a fixed bar to support said guide levers and an adjustable double swivel clamp for each of these guide levers, one element of which embracing the guide lever and the other the said fixed bar, substantially as hereinbefore described.

7. In a machine for cutting toothed wheels, especially bevel wheels on the rolling principle, the combination of a wheel-bearing puppet, means for producing a relative rolling movement between such puppet and the tools, said puppet having a mandrel and an adjustable barrel through which and a washer on the mandrel is placed the wheel blank, a rotary cylinder for receiving the barrel, a dividing device to which such cylinder is connected, means for carrying the cylinder and the dividing device and means for supporting said carrying means substantially as hereinbefore described.

In witness whereof, I have hereunto signed my name in the presence of two subscribing witnesses.

GEORGES NARDIN.

Witnesses:
DEAN B. MASON,
JOHN BAKER.